United States Patent Office 3,460,961
Patented Aug. 12, 1969

3,460,961
PROCESS OF COATING A SUBSTRATE WITH A POLYMERIC ULTRAVIOLET LIGHT BARRIER COATING AND THE COATED SUBSTRATE
Raymond H. Young, Jr., East Longmeadow, Saul M. Cohen, Springfield, and Albert H. Markhart, Wilbraham, Mass., assignors, by mesne assignments, to Monsanto Company, a corporation of Delaware
No Drawing. Filed Apr. 21, 1965, Ser. No. 449,885
Int. Cl. C09k 1/00
U.S. Cl. 117—33.3        9 Claims

ABSTRACT OF THE DISCLOSURE

Disclosed herein are substrates which are protected with a transparent adherent coating of two contiguous superposed layers; which coating affords a barrier to ultraviolet light; wherein the inner layer is a polymer having repeating units corresponding to the following general structural formula:

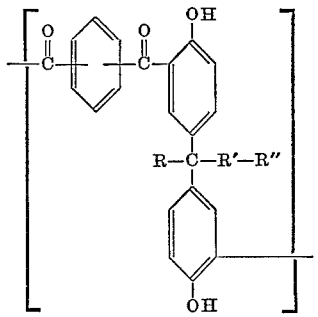

and wherein the outer, exposed layer is a polymer having repeating units corresponding to the following general structural formula:

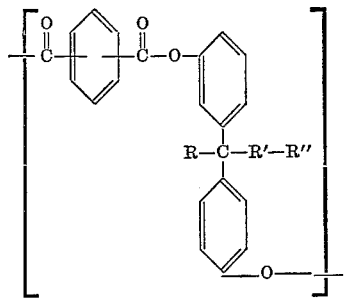

wherein the above formulae R may be H and $CH_3$, R' is $(CH_2)_n$ where $n$ is an integer of from 1 to 5, and R" is H or —COOR''' where R''' is an alkyl group having from 1 to 18 carbon atoms; or an alkyl ether having 3 to 14 carbon atoms, and the phenyl groups in the above formulae may have non-reactive alkyl and carboxy alkyl ester substituents thereon.

---

The present invention relates to coating compositions capable of absorbing ultraviolet light and acting as a barrier to ultraviolet light. More particularly the present invention relates to transparent, aromatic polyester coating compounds which will undergo rearrangement in the presence of ultraviolet light to form a transparent compound which is stable to and will act as a barrier to ultraviolet light.

Ultraviolet light is that portion of the spectrum just beyond violet on the short wave length side, generally from 180–390 m$\mu$. Ultraviolet light is emitted by sunlight, carbon arc lamps, mercury vapor lamps, tungsten arc lamps and other light sources. The invisible rays from the ultraviolet region induce chemical activity which is both beneficial and adverse. Some of the adverse effects of ultraviolet light are degradation of synthetic resin, such as polyvinyl chloride, used in exterior structures and articles exposed to sunlight, including rear windows used in convertibles and the like; fading or discoloration of white or dyed synthetic and natural textiles; fading and deterioration of cellulosic materials such as wood, paper, and the like, tarnishing and discoloration of metals; fading of black and white and colored photographic prints; fading and discoloration of paints; etc. Indeed, the full list of adverse effects of ultraviolet light is too numerous to be set forth here.

Some aromatic polyester coating compositions currently available afford some partial degree of protection. These materials are inadequate by virtue of the fact that they either have undesirable color or they are not opaque to ultraviolet light, or more likely, they themselves are subject to ultraviolet light degradation.

The primary object of this invention is to produce coating compounds which will act as barriers to ultraviolet light.

Another object is to provide clear, soluble, essentially linear, non-crosslinked polyesters which will rearrange in the presence of ultraviolet light to form a clear, stable barrier for ultraviolet light.

Another object of this invention is to provide coated substrates which will be resistant to the adverse effect of ultraviolet light.

Another object of this invention is to teach a method of preparing coating compositions which act as a barrier for ultraviolet light.

Another object of this invention is to provide a substrate with two contiguous, superposed layers; one of which is formed by the rearrangement of the polyester layer and is capable of renewing or regenerating itself from the polyester layer.

These and other objects are attained by preparing an aromatic polyester which is the reaction product of certain aromatic dihydric compounds, having two phenolic hydroxy groups, with an aromatic dicarboxy compound. These polyesters must be clear, soluble, and capable of forming continuous films. The monomeric reactants and the polymerization process must therefore be selected to produce clear polymers with a molecular weight of at least 5,000 and up to 200,000 which are essentially non-crosslinked.

The aromatic dihydric compound may be a dihydric phenol represented by the following compounds: resorcinol, 2,4-dihydroxyacetophenone, 2-methylhydroquinone, 5-methylresorcinol, 2-methylresorcinol, catechol, hydroquinone, 5-chlororesorcinol, 4-ethylresorcinol, 2-benzylresorcinol, 5-propylresorcinol, 2-hexylresorcinol. The aromatic dihydroxy compound may also be selected from a group represented by bisphenols such as bisphenol A or bisphenol B or their derivatives. This group may include such compounds as 2,2-bis(4'-hydroxyphenyl) propane, 2,2-bis(4'-hydroxyphenyl) butane, 2,2 - bis(4' - hydroxyphenyl)-4-methylpentane, esters of 4,4 - bis(4' - hydroxyphenyl) pentanoic acid (e.g. the butyl ester) and such esters wherein the alcohol portion of the ester contains atoms other than carbon such as an ether linkage (e.g. the butyl Cellosolve ester), and bisphenol dipentene. The dihydroxy compound may also be a fused aromatic compound such as represented by dihydroxynaphthalene, dihydroxyanthracene, and dihydroxyanthraquinones. Compounds selected from these three groups must have at least one unsubstituted position ortho to at least one of the phenolic hydroxyl groups and said phenolic hydroxyls must be capable of bifunctional esterification to produce high polymers.

The aromatic dicarboxy compound can be an aromatic dicarboxylic acid or an aromatic dicarboxylic acid halide or other ester-forming derivatives of the dicarboxylic acids, such as substituted compounds and alkyl esters of these acids, which are free of functional groups which would interfere with or compete with the bifunctional esterification reaction. These compounds are represented by terephthalic acid and isophthalic acid, chlorides or alkyl esters of said acids, and substituted compounds thereof also capable of polymerization by esterification. Others may include tetrachloro terephthalic acid, diphenic acid and others. These acids may have more than one aromatic ring which may or may not be fused.

The resultant polyester is dissolved in an organic liquid solvent, the polyester being present in an amount of 0.5% to about 75% by weight of the total weight of polyester and solvent. The organic solvent is selected from the groups consisting of aliphatic and aromatic halogenated hydrocarbons, aromatic and aliphatic ketones, aromatic hydrocarbons, disubstituted acetamides, aromatic esters, aliphatic and aromatic amines, aromatic ethers, aliphatic cyclic ethers, aromatic alcohols, aliphatic and alicyclic sulphoxides and sulphones, and unsaturated alkyl aromatics. The polyester solution is applied to the substrate to be protected and the solvent is evaporated by any of the conventional means such as air drying, flashing the solvent off at high temperatures and drying in vacuum.

Upon exposure to ultraviolet light the exposed outer surface of the polyester rearranges to form a coating of poly(ortho-hydroxybenzophenone) or an analog thereof, which is capable of acting as a stable barrier to ultraviolet light. Thus, it will be seen that to have this unique property of opacity to and stability to ultraviolet light the poly-(ortho-hydroxybenzophenone) must be comprised of two aromatic rings with one ketone group between them and at least one hydroxyl group in a position ortho to the ketone.

Coatings of these polyesters only rearrange as a thin layer on the surface exposed to ultraviolet light for as the rearranged materials are formed on exposure they block any further transmission of ultraviolet light into the coating. It is therefore the unique property of these coatings to replenish the poly(ortho-hydroxybenzophenones) as these rearranged materials are gradually worn away by various conditions such as abrasion or ultimate chemical or physical degradation. In effect then, the coatings comprise a reservoir system wherein a surface exposed to ultraviolet light forms a continuous thin portion of rearranged polymer both stable to and opaque to ultraviolet light while the remaining polyester is available to regenerate or renew a rearranged portion when and if the protective portion is eroded or loses its efficiency.

It is to be noted that whereas the rearranged portion is usually the outer surface of the coating on most substrates, the rearranged material may be the inner or under surface of the coating if the coating is placed on the inner side of a substrate such as glass, transparent (to some degree) to ultraviolet light. The polyester portion of the coating in itself cuts out ultraviolet light up to about 300 m$\mu$ while the rearranged portion absorbs light from about 300 m$\mu$ to above about 400 m$\mu$. This screening effect may of course overlap somewhat, and, in the case of certain rearranged materials may cut off light up to 450 m$\mu$.

It appears that even a monomolecular film of the rearranged polymer will afford protection of a substrate from ultraviolet light while the maximum thickness of the rearranged polymer portion of a coating attainable under normal circumstances is about 0.1 mil. The polyester portion of the coating may be from 0.1 to 5 mils thick although the total thickness of the coating will generally be no more than 1.5 mils thick even when applied by lamination as a free film.

The polyesters are preferably prepared according to one of the well known interfacial polymerization techniques such as the method set forth by W. M. Eareckson III in the "Journal of Polymer Science," vol. XL, pages 399–406 (1959). It is thereby convenient to polymerize rapidly at low temperatures in order to obtain colorless, soluble products.

The following examples are given by way of illustration, and not by way of limitation of the invention.

EXAMPLE I

The polyester was prepared according to the following procedure:

Charge A (1) Resorcinol _____ mole__ 0.025
(2) Water _____ ml__ 150
(3) 10% sodium lauryl sulfate solution in water _____ ml__ 15
(4) Sodium hydroxide pellets _____ g__ 2.0
(5) Chopped ice _____ g__ 100
(6) Antifoam _____ drops__ 4

Charge B (7) 1:1 molar mixture of isophthaloyl chloride and terephthaloyl chloride _____ mole__ 0.025
(8) Chloroform _____ ml__ 75

Charge A was placed in a Waring Blendor and the speed of the stirring regulated by a Powerstat. The solution was cooled to 3° C. by the addition of the ice and the stirring increased to the maximum. Charge B was then added quickly in one portion and the container rinsed with an additional 5–10 ml. of chloroform to ensure the addition of all the diacid chloride. If the temperature of the polymerization rose to 7° C., an additional 100 g. of ice was added. The emulsion was stirred for five minutes. Then the solid polymer was isolated either by pouring the emulsion into 1 liter of acetone or by adding acetone to the emulsion until coagulation occurred. The polymer was washed three or four times in the Waring Blendor with hot water, and finally it was collected on a Buchner funnel where it was washed with acetone. The polyester was then dried in a vacuum oven at 90° C./15 mm. for 15–20 hours. A white product was obtained in a 94% yield and a 0.5% solution in a 75:25 by volume mixture of phenol and tetrachlorethane had an inherent viscosity of over 0.66 at 30° C. Similar preparations in chloroform or methylene chloride also yielded polymers having inherent viscosities of over 0.90 which are approximately equivalent to a molecular weight of about 50,000. The softening point of these latter polymers was about 218° C.

A 4% by weight solution in chloroform of one of these I/T polyesters of resorcinol having an inherent viscosity of 0.93 was prepared. This solution was cast on a portion of a color photoprint (Kodacolor) and allowed to dry at room temperature, forming a film with a thickness of 0.03 mil.

Similar prints were partially coated with film ranging from 0.1 to 0.45 mil in thickness. The prints were then irradiated with a 450 watt ultraviolet lamp at a distance of 25 cm. The unprotected portions of the prints faded rapidly, with the various blue dyes being the first to show signs of fading. The unprotected portion was bleached to a red-brown color after only 4½ hours. After 171 hours the portion protected with a polyester coating at a thickness of 0.1 mil was just beginning to show fading of the blue component.

To compare the effectiveness of these polyphenyl esters with other polymers, a 1.5 mil film of poly(ethylene terephthalate) was placed over a portion of the color prints. Within 28 hours of exposure, fading was noticed in the protected colors of the photoprints and the film itself became frosted and opaque.

Other comparisons were carried out using commercial acrylic resins containing 5% by weight of resin of standard monomeric ultraviolet absorbers. Film thicknesses of 2.0 mils on the photos showed that fair protection of the colors was possible for some period. However, the acrylic films were badly cracked and blistered. When these acrylic coatings were coated onto photos at a thickness of 0.3 mil, fading occurred under the protected portion as rapidly as it did on the unprotected portion of the photo.

EXAMPLE II

A polyester was prepared by the method set forth in Example I. The resorcinol was polymerized with a 70 to 30 molar ratio of isophthalic acid and terephthalic acid. The polymers formed were similar to those in Example I. A solution of the polymer in methylene chloride containing a small amount of cyclohexanone (0.158 part to one part) was used to form a 1-mil thick coating on a portion of coated paperboard coated with fluorescent dye paints. The coated paperboard was placed approximately 25 centimeters below a 450 watt U.V. lamp. The unprotected portion of the fluorescing paints lost their fluorescence within 6 minutes while the fluorescence of the protected portions remained essentially unchanged even after 30 hours. The colors in the paints also faded on the unprotected portions while protection was greater than 90% for the coated portion.

EXAMPLE III

Another similar polymer was prepared by the method set forth in Example I; however, in this case, the resorcinol was polymerized with a mixture of isophthalic and terephthalic acids in a molar ratio of 30–70 respectively. This polymer showed similar properties in protecting fluorescent paints from ultraviolet irradiation.

EXAMPLE IV

Charge A

| | |
|---|---|
| (1) Bisphenol-A (para, para'-isopropylidenediphenol) g__ | 142.68 |
| (2) Sodium hydroxide pellets g__ | 51.0 |
| (3) Water l__ | 3.75 |
| (4) 10% solution sodium lauryl sulfate in water g__ | 375.0 |
| (5) Defoamer g__ | 2.5 |
| (6) Crushed ice l__ | 2.1 |

Charge B

| | |
|---|---|
| (1) Isophthaloyl chloride g__ | 63.44 |
| (2) Terephthaloyl chloride g__ | 63.44 |
| (3) Purified, dry chloroform ml__ | 1875 |

The interfacial condensation was carried out in a 12 liter glass jar using an Eppenbach Homomixer for stirring. Charge A was placed in the jar and the stirrer increased to its maximum speed (~7500 r.p.m.). The initial temperature of the mixture was held at about 6° C. with additions of ice. Charge B was added in a thin stream, and ice was added to maintain the polymerization temperature in the range of 10–15° C. The reaction was stirred for 10 minutes, then transferred to a 22 liter stainless steel tub and stirred while 10 liters of acetone was added in a steady stream. The slurry was stirred for one hour at room temperature after which the liquid was removed by filtration through a filter screen using aspirator vacuum. The resin was then washed twice with hot water followed by 4 cold water washes. A final wash was made with acetone. The white resin was then dried under full vacuum in a vacuum oven at 85–90° C. overnight.

The polymer was obtained in a yield of 95% and had an inherent viscosity of 1.26. Others were similarly obtained with yields ranging from 95–98% and inherent viscosities of 0.84 to 1.26.

Rigid polyvinyl chloride sheets coated with about a 1.0 mil thickness of this polyphenyl ester showed very little or no degradation after being irradiated by a 450 watt U.V. lamp for 179 hours. Uncoated, unstabilized polyvinyl chloride, and even uncoated polyvinyl chloride stabilized with monomeric U.V. absorbers, began to degrade after 2 hours of irradiation under this lamp.

The rearrangement of the polyester to poly(orthohydroxybenzophenones) was studied in the following manner.

A 0.55 mil film of the above bis AI/T (polyester) was cast on glass from a 5% solution in chloroform. The clear, transparent film was transferred to a standard IR cardboard specimen holder. The film was placed directly below a 100-watt U.V. lamp and after various time increments, an IR spectrum of the film was obtained. These spectra were obtained both for the exposed side and for the unexposed side of an irradiated film by means of an attenuated total reflectance (ATR) attachment for a Beckman IR–5 spectrophotometer. Proof of the rearranged structure was obtained by measurement of the bands in the region $5.5\mu$ to $13\mu$.

The absorbance of the new benzophenone carbonyl peak formed at $6.12\mu$ by the irradiation was divided by the C-H absorbance at $3.35\mu$ using a standard baseline method to give a relative value for the amount of carbonyl present. The initial value of zero of this proportion, gradually grew to 0.17 on 15.5 hours of irradiation, to 0.48 after 70 hours and started to level off at approximately 0.65 after about 175 hours. This levelling is believed due to the fact that the surface polymer molecules have rearranged to ultraviolet absorbing groups, thus prohibiting any further ultraviolet radiation from penetrating the film. At the same time, a decrease was noted in the ester carbonyl at $5.78\mu$. No changes were found on the unexposed side.

The U.V. lamp used for irradiation was a Hanovia 100-watt high pressure quartz mercury-vapor lamp, model 608A. The lamp was 25 cm. above the film. The approximate intensity of the ultaviolet radiation at 336 m$\mu$ reaching the film was 100 microwatts/cm.$^2$. The total output of U.V. radiation from the lamp was 4.64 watts which represented 40.3% of the total radiation emitted, the remaining 59.7% consisting of visible and infrared radiation.

The rearranged polyester is stable to ultraviolet radiation without undergoing apparent chain scission or crosslinking for at least 1,000 hours under the above conditions. Samples so exposed were found still soluble in chloroform. Additional proof of the rearranged structure was obtained by measuring the band intensities with an ultraviolet spectrophotometer.

When a film of poly(bisphenol A carbonate) was similarly irradiated for 800 hours, an IR spectrum showed no new bands in the region $5.8$–$6.2\mu$. Obviously, all aromatic polyesters do not undergo this rearrangement, but rather they require a judicial selection of monomers and polymerization conditions. An aromatic polyester 2,2-bis (3',5'-dichloro-4'-hydroxyphenol) propane and isophthalic acid similarly failed to show evidence of rearrangement on irradiation.

EXAMPLE V

A polyester was prepared by the method set forth in Example I using the 1:1 mixture of the phthalic acid derivatives. However, the dihydric compound was 2,2,-bis (4'-hydroxyphenyl) 4-methylpentane. A 7% solution in toluene was coated on panels of polyvinyl chloride containing 0.3% U.V. stabilizer, the thickness of the coating being about 1.0 mil.

EXAMPLE VI

Another polymer was prepared by the method similar to the preceding example. However, the phenol used was 2,2-bis(4-hydroxyphenyl)butane. Polyvinyl chloride sheet was again coated as in Example V.

EXAMPLE VII

A polyester was prepared as in the preceding example. The dihydric material used being a mixture of resorcinol and bisphenol B (the phenolic material of Example VI) in a 75 to 25 mol percent ratio respectively.

EXAMPLE VIII

Another polyester was prepared as in Example VII. However, 75 mol percent of bisphenol B was used with 25 mol percent of resorcinol.

The polymers of Examples VII and VIII were coated on polyvinyl chloride panels as in Examples V and VI. The coated panels of Examples V to VIII were exposed along with uncoated panels, to accelerated U.V. testing by placing under a bank of lights yielding strong ultraviolet irradiation. Examination after 48 hours revealed that the uncoated polyvinyl chloride had become a very dark blue or purple in color while the coated panels were virtually unchanged except for a very slight yellowing in the coating itself. Polyvinyl chloride panels coated as in the preceding four examples have been placed in a weatherometer for 2100 hours without showing any sign of degradation while uncoated materials were virtually destroyed. The weatherometer is an apparatus exposing the test panels by rotating them around a carbon arc lamp. One hour in the weatherometer is considered approximately equivalent to about one day of sunshine. This device has the further weathering effect of spraying the panels with water for about 18 minutes of every 2-hour cycle. This is essentially according to ASTM method D-822-46T.

Testing in a weatherometer, being a standard method of determining an accelerated life of a coating, is especially effective in studying the efficiency of these polyester materials in the weathering and subsequent "healing" (replacement of the degraded, worn or washed-away rearranged surface by new U.V. stable materials from the polyester reservoir).

Clear coatings of these rearranged polyesters on cedar shakes and redwood panels as well as copper and brass plates were also exposed in a weatherometer for approximately 2100 hours. The protective effect of these coatings was still substantial at this point while blanks of the woods were badly bleached and showed signs of cracking and the metal blanks were discolored and tarnished.

Free films may also be cast from solutions of these polyesters. These films can be conveniently laminated on substrate surfaces with heat and pressure. Excellent adhesion to plasticized polyvinyl chloride sheet has been obtained by using an electrically heated press, the sandwich to be laminated being subjected to 130 p.s.i.g. at 345–350° C. for two minutes. A 0.5 mil thick film of rearranging polyester so laminated produced superb protection from U.V. light.

Further testing was accomplished by merely overlaying a 1.0 mil film of the rearranging polyester on a wide variety of substrates giving complete protection against U.V. irradiation compared to an unprotected portion of the substrate. The substrate, time of irradiation and changes noted are given below. These materials were irradiated with a 450 watt U.V. lamp, the protection film used having been produced from the polyester of Example IV. The color was determined on a Klett-Sommerson photometer.

| | Time (hours) | Unprotected | Protected |
|---|---|---|---|
| (1) Polypropylene | 96 | Crumbled | No change. |
| (2) Polyethylene | 72 | Shredded | Do. |
| (3) Cellulose nitrate | 115 | 44% yellowing and opaque. | |
| | 301 | | 1.4% yellowing. |
| (4) Cellulose acetate-butyrate. | 231 | 16% yellowing and frosted. | |
| | 250 | | 1.9% yellowing. |
| (5) Poly(ethylene terephthalate). | 96 | Opaque and brittle. | No change |
| (6) Poly(vinyl alcohol) | 96 | Tan | Do. |
| (7) Poly(vinyl acetate) | 96 | Tan and brittle. | Do. |
| (8) Poly(vinyl butyral) | 96 | Opaque | Do. |
| (9) Poly(methyl methacrylate). | 96 | Yellow | Do. |
| (10) Poly(acrylonitrile) | 96 | Brown | Do. |
| (11) Polystyrene | 96 | Yellow | Do. |
| (12) Poly(vinyl chloride-vinylidene chloride) copolymer. | 96 | Brown | Do. |
| (13) Dyed cotton | 96 | Color bleached and tan. | Do. |
| (14) Undyed cotton | 96 | Tan | Do. |
| (15) Nylon | 96 | Light yellow | Do. |
| (16) Bisphenol A polycarbonate U.V. stabilized. | 96 | Yellow and frosted. | Do. |

These polyesters are also useful as coatings on glass or plastic bottles to protect or shield the contents from the harmful effects of U.V. light. Films having a thickness of 0.5 mil on glass bottles should protect the contents (such as pharmaceuticals) which would be inactivated by U.V. light in the range of 200 to about 400 m$\mu$. Thin coatings on glass-paned windows should also give useful protection to items in the interior such as fabrics, drapes and rugs.

Further rearrangeable polyesters were prepared from such phenols as 2-methylhydroquinone; 2,4-dihydroxyacetophenone; 5-methylresorcinol; 4-hexylresorcinol; 4-chlororesorcinol; 4-benzylresorcinol; dihydroxynaphthalene; dihydroxyanthracene; bis(4'-hydroxyphenyl) sulfone, other alkyl resorcinols, phenolphalein, and the like.

Other acids and combinations thereof have also been used such as oxydibenzoyl chloride, mono-alkyl esters of trimellitic acid, substituted phthalic acids, and the like.

In general, both the adhesion ability and the abrasion resistance of these coatings has been surprisingly satisfactory. It has been found especially advantageous to prepare copolymers of these polyesters using two different dihydric materials and/or a mixture of diacids. In this manner, it is possible to obtain polyesters combining desirable solubility properties, such as ease of solution as well as stability of solution, with properties such as film clarity and film strength.

Epecially stable solutions of rearranging polyesters have been prepared by copolymerizing mixtures of resorcinol and 2-methylresorcinol in a molar ratio of 75:25 to 25:75 respectively with the dicarboxy compound. Similarly advantageous are copolymers of resorcinol and bisphenol A or B.

Certain polyesters which are not rearrangeable such as poly(bisphenol A carbonate) may give some protection at wave lengths below 300 m$\mu$ because of their aromatic nature. However, they give no protection above 300 m$\mu$ and do degrade at these higher wave lengths. In addition, because of their inability to rearrange, they lack the ability to renew themselves. Polystyrene is known also to furnish some protection against U.V. light. In its action, it also is not stable to U.V. light and so its protective action is short lived. In contrast thereto, methyl methacrylate doesn't protect substrates from U.V. light but is stable thereto. The present polyesters advantageously combine the best ultraviolet properties of these two preceding materials.

Other nonrearrangeable polyesters have been formed using 2,2 - bis(3′,5′ - dimethyl-4′-hydroxyphenyl) propane as the phenolic material with a mixture of isophthalic and terephthalic acids, as well as polyesters derived from fumaric acid with bisphenol A.

Certain monomeric materials may be usable but preferably only in small amounts because they may adversely affect the solubility of the products formed or inhibit the polymerization by limiting the products to low molecular weight. Such materials include ortho-phthalic acid and catechol or materials containing crosslinkable groups.

These polymeric U.V. stabilizers have also been incorporated into other polymer substrates by admixture with the substrate material. For example, 0.5% by weight of the polymer was incorporated into both plasticized and unplasticized polyvinyl chloride which was thereupon formed into sheets for testing. However, it was found that such admixture was inefficient in protecting from U.V. light when compared to the effect of coating the substrate. Apparently the ease of rearrangement in the coating surface and the concentrated continuous layer of rearranged material on the surface of the coating is the reason why a coating is superior to the use of the dispersed polymer.

The polymerization of these polyesters is conducted with a non-reacting organic liquid which is a solvent for both the monomers used and the polymers produced in order to achieve the high molecular weights desired. When using interfacial condensation, the organic solvent must be capable of furnishing a two-phase system with the second liquid. Such solvents may be selected from those which are used as the solvents in the solution coating compositions containing these various polyesters. The solubility and solution stability will, of course, vary for each polymer with different solvents, and in some instances, mixtures of solvents are preferred. Some of the solvents used for coating compositons include aliphatic and aromatic halogenated hydrocarbons such as chloroform, methylene chloride, ethylene chloride, chlorobenzene; aromatic and aliphatic ketones such as methyl ethyl ketone, cyclohexanone and acetophenone; aromatic hydrocarbons such as benzene, toluene and xylene; disubstituted amides such as dimethyl acetamide; aromatic esters such as phenyl acetate; aliphatic amines such as morpholine; aromatic amines such as pyridine; aromatic ethers such as dibenzyl ether, diphenyl ether; aliphatic cyclic ethers such as dioxane; aromatic alcohols such as phenols; aliphatic and alicyclic sulphoxides and sulphones such as dimethyl sulfoxide, 1,1-dioxy-tetrahydrothiophene; and unsaturated alkyl aromatics such as styrene. Others include Cellosolve acetate, methyl Cellosolve acetate, butyl carbitol, tetrahydrofuran, diacetones alcohol and dimethyl formamide.

The chlorinated hydrocarbons such as methylene chloride and chloroform are especially preferred both as polymerization solvents and as solvents for the coating compositions. Aromatic solvents such as toluene are also especially useful solvents for forming coating compositions from a variety of these polymers.

The coating compositions of this invention capable of forming clear films which are stable to and absorb ultraviolet light comprise solutions of about 0.5% to about 75% of a polyphenyl polyester in a volatile organic solvent having a boiling point of about 40° C. to about 200° C. These aromatic polyesters having molecular weight of 5,000 to 200,000 are the polymeric reaction product of dihydric compounds having two phenolic hydroxyl groups with at least one unsubstituted position ortho to at least one of the phenolic hydroxyl groups with an aromatic reactive dicarboxy compound. The polymerization of these materials is by means of esterification.

These dihydric compounds have the general formula OH—R—OH wherein R may be aryl, alkaryl, sulfone aryl, ketone aryl, oxyaryl, carboxyalkaryl and ester and amide derivatives of carboxyalkaryl. R being an aryl containing component, it may contain one, two or more aromatic groups which may be joined by a variety of linkages such as carbon itself, the sulfone group and others. These phenyl groups may also be fused rings. When the phenyl groups are linked by a carbon, this carbon may be part of straight and branched alkyl groups or attached to a variety of other non-reactive radicals such as carboxyl esters, amides and ethers. As indicated above, mixtures of these dihydric compounds may be especially suitable.

A typical protective coating is of two contiguous, superposed layers; (1) one layer being an aromatic polymer which is a rearranged polyester having stability as well as opacity toward ultraviolet light, said polymer having repeating units of a structural formula selected from the group consisting of (a) 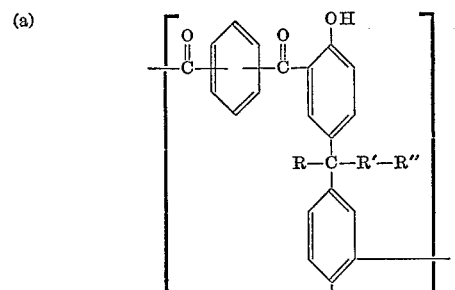

(b) 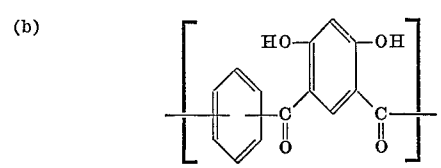

and
(c) mixtures of (a) and (b).

These polymers are formed by rearrangement caused by ultraviolet light of another layer (2) of polyesters of a molecular weight of at least 5,000 having repeating units of a structural formula selected from the group consisting of (d) 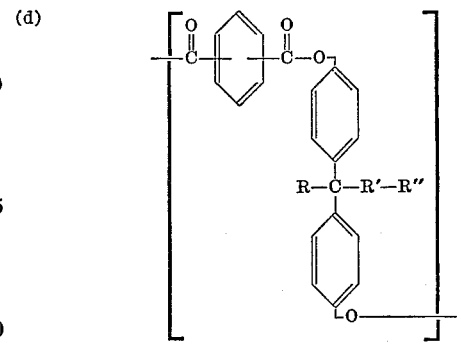

(e) 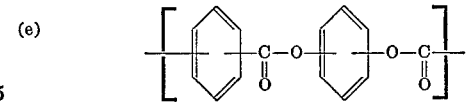

and
(f) mixtures of (d) and (e).

Wherein the above formulae R may be H and $CH_3$, R′ is $(CH_2)_n$ where $n$ is 1–5, and R″ may be H and COOR‴ where R‴ may be an alkyl group having from 1 to 18 carbon atoms and an alkyl ether having 3 to 14 carbon atoms, and the phenyl groups in the above formulae may have non-reactive alkyl and carboxy alkyl ester substituents thereon.

One preferred embodiment of these protective coatings comprises a layer (1) having repeating units of the structural formula

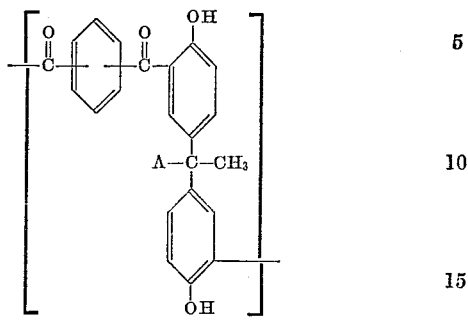

which is formed by ultraviolet irradiation of a layer (2) of a polyester which has repeating units of the structural formula

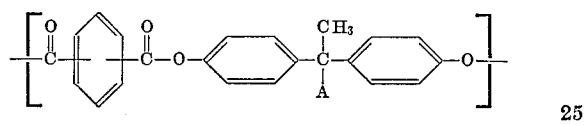

Wherein A in the above formulae is an alkyl group having from 1 to 5 carbon atoms.

The coating compositions are therefore organic solvent solutions of aromatic polyesters which form clear adherent continuous coatings, which, on exposure to ultraviolet light rearrange on the exposed surface to form ultraviolet stable layers, which are also opaque to ultraviolet light. These rearranged layers must contain recurring units comprising 2 aromatic groups, such as phenol joined by the carbon of a carbonyl group, at least one of the aromatic groups having a hydroxyl group ortho to the carbonyl linkage. The remaining non-rearranged polyester resin is protected from the ultraviolet light by the rearranged layer. However, on weathering or other removal of the effects of the rearranged layer, the polyester functioning as a reservoir readily forms new rearranged layers on exposure to ultraviolet light.

It is readily seen that in addition to the many uses illustrated above there are innumerable other applications for these unique coating compositions. Polymeric materials, such as vinyl chloride polymers, are especially benefited by these protective coating compositions. These coating compositions might be applied to fluorescent bulbs or in the windows of space vehicles. They may be used as a non-coloring floor coating or to coat walls, panels, or fixtures. Fabrics such as drapes, and clothing after being dry-cleaned, may be beneficially spray-coated therewith. A great variety of foams, fiber, metals and films, especially synthetic textile fibers, could be protected with these materials. Numerous dyed and fluorescent materials can be protected therewith. Color photo transparencies can be protected as well as photoprints. In addition to coatings, laminations such as in the rear windows of convertible automobiles can be considered. They may also be considered for anti-tanning lotions and as protection for automobile finishes. Further, they can be considered as photo-sensitive films for photo printing.

This invention has been described above; however, it is not so limited. Variations and modifications thereof may be made without departing from the spirit or scope of this invention.

What is claimed is:

1. A substrate coated with a clear adherent coating of two contiguous superposed layers, wherein said coating affords a barrier to ultraviolet light and comprises (1) an exposed layer having a thickness of more than a monomolecular layer and up to about 0.1 mil, said layer being an aromatic polymer with at least one hydroxyl group in an ortho position to at least one ketone group in each polymer unit, said polymer having repeating units of a structural formula selected from the group consisting of (a)

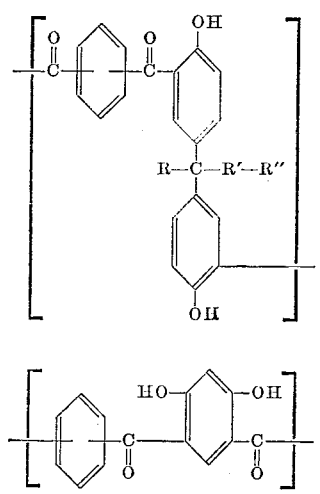

(b)

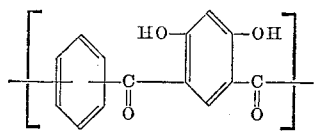

and (c), mixtures of (a) and (b); and (2) an inner layer which is a polyester with a molecular weight of at least 5,000 which is soluble in a volatile organic solvent having a boiling point of about 40° C. to about 200° C.; said layer having a thickness of from 0.1 to 5 mils, said polyester having at least one unsubstituted position ortho to at least one ester linkage in each polymer unit, said polyester having repeating units of a structural formula selected from the group consisting of (d)

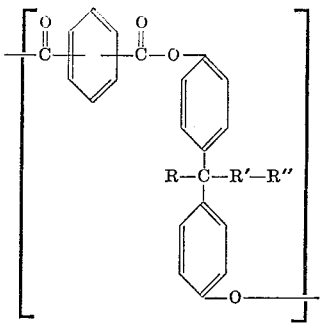

(e)

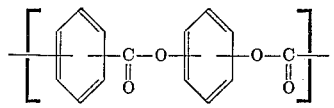

and (f), mixtures of (d) and (e) where in the above formulae, R is selected from the group consisting of H and $CH_3$; R' is $(CH_2)_n$ wherein $n$ is an integer of from 1 to 5; and R" is H; and the phenyl groups in the above formulae are selected from the groups consisting of unsubstituted and substituted phenyl groups wherein the substituents are selected from the group consisting of non-reactive alkyl and non-reactive carboxy alkyl ester substituents, and wherein exposed polymer layer (1) is the ultraviolet rearrangement product of the inner polyester layer (2).

2. A substrate coated as in claim 1 wherein the polymer layer (1) has repeating units of the structural formula

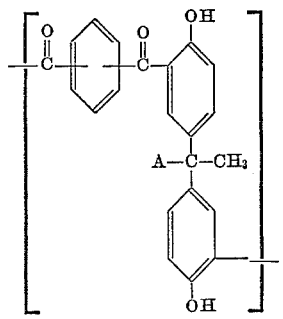

and the polyester layer (2) has repeating units of the structural formula

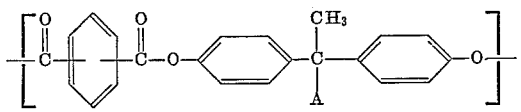

wherein A in the above formulae is an alkyl group having from 1 to 5 carbon atoms.

3. A substrate coated as in claim 1 wherein the polyester is the polymerization reaction product of
 (a) a mixture of 25 to 75 mol percent of resorcinol and 75 to 25 mol percent of 2,2-bis(4'-hydroxyphenyl) butane; and
 (b) a mixture of from 30 to 70 mol percent isophthalic acid and 70 to 30 mol percent terephthalic acid.

4. Sheet material coated with a clear adherent coating of two contiguous superposed layers, wherein said coating affords a barrier to ultraviolet light and comprises:
 (1) an exposed layer having a thickness of more than a monomolecular layer and up to about 0.1 mil, said layer being an aromatic polymer with at least one hydroxyl group in an ortho position to at least one ketone group in each polymer unit, said polymer having repeating units of a structural formula selected from the group consisting of (a)
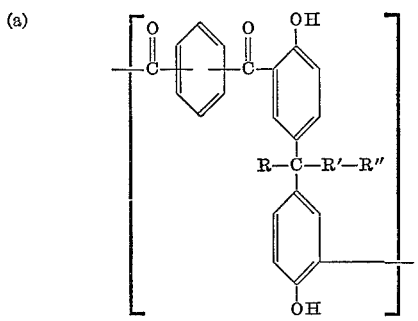

(b)
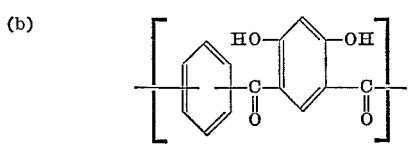

and (c), mixtures of (a) and (b); and
 (2) an inner layer which is a polyester with a molecular weight of at least 5,000 which is soluble in a volatile organic solvent having a boiling point of about 40° C. to about 200° C.; said layer having a thickness of from 0.1 to 5 mils, said polyester having at least one unsubstituted position ortho to at least one ester linkage in each polymer unit, said polyester having repeating units of a structural formula selected from the group consisting of (d)
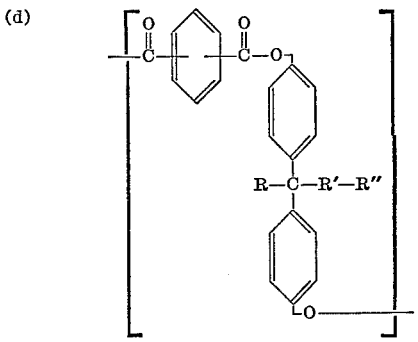

(e)
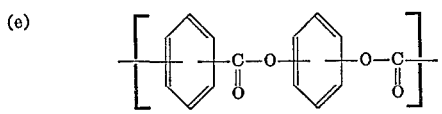

and (f), mixtures of (d) and (e) where in the above formulae, R is selected from the group consisting of H and $CH_3$; R' is $(CH_2)_n$ wherein $n$ is an integer of from 1 to 5; and R" is H; and the phenyl groups in the above formulae are selected from the groups consisting of unsubstituted and substituted phenyl groups wherein the substituents are selected from the group consisting of non-reactive alkyl and non-reactive carboxy alkyl ester substituents, and wherein exposed polymer layer (1) is the ultraviolet rearrangement product of the inner polyester layer (2).

5. Coated sheet material as in claim 4 wherein the substrate sheet material is a synthetic resin polymer.

6. Coated sheet material as in claim 4 wherein the substrate sheet material is cellulosic sheet.

7. Coated sheet material as in claim 4 wherein the substrate sheet material is a photo print.

8. Coated sheet material as in claim 5 wherein the synthetic resin polymer is polyvinyl chloride.

9. The process of protecting vinyl chloride polymer substrates from ultraviolet irradiation by applying a solution of a polyester in a volatile organic solvent having a boiling point of about 40° C. to about 200° C. to the substrate and drying to form an adherent, transparent coating having a thickness of 0.1 to 1.5 mils, said polyester having a molecular weight of 5,000 to 200,000 and being the polymeric reaction product of
 (a) a mixture of resorcinol and 2-methylresorcinol in a molar ratio of 75:25 to 25:75, respectively; and
 (b) a mixture of isophthaloyl chloride and terephthaloyl chloride in a molar ratio of 30:70 to 70:30, respectively.

References Cited

UNITED STATES PATENTS 2,961,427  12/1960  Walter _____ 260—860
2,976,259  3/1961   Hardy et al. _____ 96—84
3,028,364  4/1962   Conix et al.
3,160,602  12/1964  Kantor et al. _____ 260—47
3,215,530  12/1965  Riebel et al. _____ 96—84

WILLIAM D. MARTIN, Primary Examiner
THEODORE G. DAVIS, Assistant Examiner

U.S. Cl. X.R.

96—84; 117—33, 76, 138, 143, 145, 161

PO-1050
(5/69)

UNITED STATES PATENT OFFICE
CERTIFICATE OF CORRECTION

Patent No. 3,460,961                    Dated August 12, 1969

Inventor(s) Raymond H. Young, Jr., Saul M. Cohen and Albert H. Markhart

It is certified that error appears in the above-identified patent and that said Letters Patent are hereby corrected as shown below:

Column 1, line 19, reads "inner" and should read - - outer - -.
Column 1, line 37, reads "outer, exposed" and should read - - inner, unexposed - -. Column 5, line 52, the numerical value reads "2.1" and should read - - 2.0 - -.

SIGNED AND
SEALED
DEC 23 1969

(SEAL)
Attest:

Edward M. Fletcher, Jr.
Attesting Officer

WILLIAM E. SCHUYLER, JR.
Commissioner of Patents